(No Model.)

R. H. ASHMORE.
PORTABLE BAKER AND BROILER.

No. 548,499. Patented Oct. 22, 1895.

Attest.
Edw. C. Duvall Jr.
D. P. Moore.

Robert H. Ashmore,
Inventor.
by Wm N. Moore,
Atty.

UNITED STATES PATENT OFFICE.

ROBERT HENDERSON ASHMORE, OF MOSSY CREEK, TENNESSEE.

PORTABLE BAKER AND BROILER.

SPECIFICATION forming part of Letters Patent No. 548,499, dated October 22, 1895.

Application filed March 19, 1895. Serial No. 642,407. (No model.)

*To all whom it may concern:*

Be it known that I, ROBERT HENDERSON ASHMORE, a citizen of the United States, residing at Mossy Creek, in the county of Jefferson and State of Tennessee, have invented certain new and useful Improvements in Portable Bakers and Broilers; and I do hereby declare the following to be a full, clear, and exact description of the invention, such as will enable others skilled in the art to which it appertains to make and use the same.

My invention relates to improvements in portable bakers and broilers; and one object of my invention is the provision of one article of this character which can be folded or collapsed to occupy a small amount of space, enabling the article to be easily transported and especially useful for picnic, excursion, or camping-out parties as well, as for household purposes.

Another object is the provision of a baker and broiler which can be easily and quickly used, and which will distribute the heat from above and below and insure a rapid and perfect cooking of the food, thereby adapting such food beneficial for infants, dyspeptics, or invalids, as well as others.

Another object of my invention is the provision of a baker and broiler which will be of extremely simple and inexpensive construction, rendering the improvement practical and desirable.

To attain the desired objects the invention consists of a portable baker and broiler embodying novel details of construction and combination of parts, substantially as disclosed herein.

Figure 1:
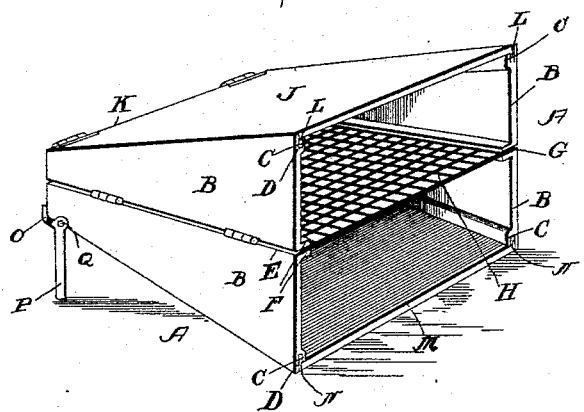
Figure 2:
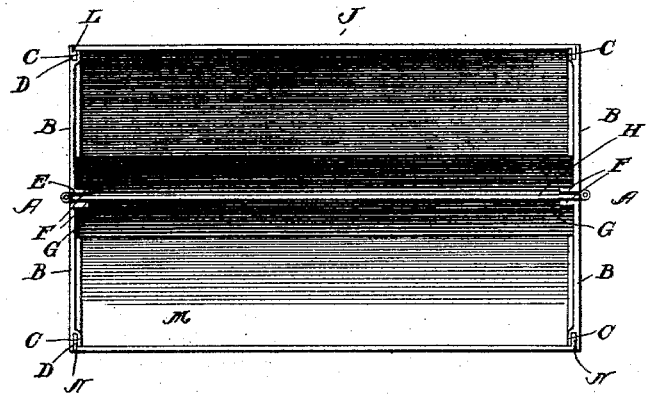
Figure 4:
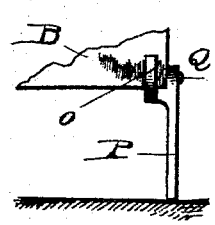
Figure 3:
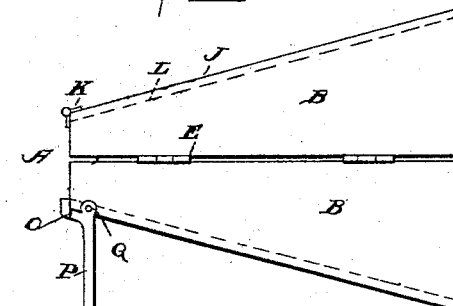

Figure 1 represents a perspective view of my improved baker and broiler in position for use. Fig. 2 represents a front elevation thereof, and Fig. 3 represents a side elevation. Fig. 4 is a detail rear view.

In the drawings, A designates the two sides of my baker and broiler, each of which consists of two hinged leaves or sections B, which are tapered or flared from their front to their rear end and are formed at their upper edges on their inner sides with flanges C, forming cleats, grooves, or channels D, and at their central or hinged portion E, opposite the hinges, with the inwardly-extending horizontally-disposed flanges F, which form a channel G for the grate H. This grate is preferably made, as shown, of strips of wire or like material crossed to form a series of openings, as shown, although any other form of grate which could be adapted for this purpose can be used effectively.

The top of my baker and broiler consists of the leaf or section J, having the hinged end K at its rear and having the vertically-depending side flanges L, which fit snugly in the vertical cleats of the sides, and the bottom consists of the leaf or section M, having the vertical flanges N, which fit in the other vertical cleats of the side, and the bottom is held further in place at the rear by means of the arms O on the legs P, which are hinged at Q to the rear of the side, as most clearly seen in Figs. 1 and 3. From this construction it will be seen that I provide a baker and broiler which can be quickly set up and taken apart, which will throw the heat from above and below equally, and which is simple, inexpensive, and practical.

I claim—

1. A portable baker and broiler consisting of the tapering sides hinged centrally and having the inward extending flanges, the grate fitted and secured between said flanges, the top and bottom portion secured to the sides, said top having a rear hinged flap or portion, and the legs hinged to the sides and having the arm for engaging said hinged portion of the top to secure the same.

2. A portable baker or broiler consisting of the tapering sides hinged centrally and having inward extending flanges and the cleats at their upper and lower edges, the grate secured between the flanges, the top and bottom portion fitting in the cleats of the sides, said top having a rear hinged flap or portion, and the legs hinged to the sides and having the arm for engaging said hinged portion of the top to secure the same.

In testimony whereof I affix my signature in presence of two witnesses.

ROBERT HENDERSON ASHMORE.

Witnesses:
J. T. WATKINS,
ROY P. GODWIN.